Figure 1:
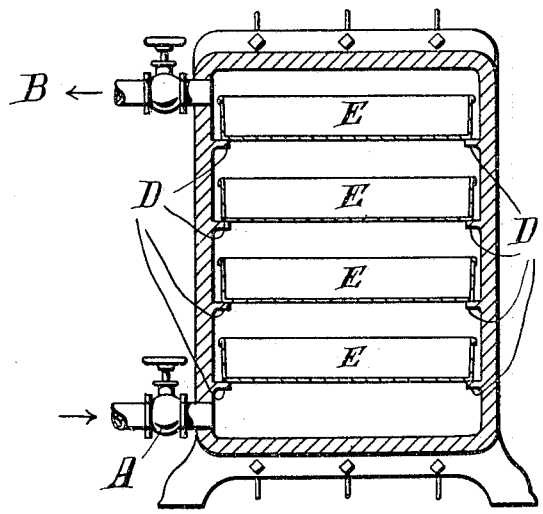

No. 766,167. PATENTED AUG. 2, 1904.
W. S. BUCKLIN.
ARTICLE OF MANUFACTURE AND PROCESS OF MAKING SAME.
APPLICATION FILED MAR. 16, 1904.
NO MODEL.

No. 766,167. Patented August 2, 1904.

UNITED STATES PATENT OFFICE.

WILLIAM S. BUCKLIN, OF PHALANX, NEW JERSEY.

ARTICLE OF MANUFACTURE AND PROCESS OF MAKING SAME.

SPECIFICATION forming part of Letters Patent No. 766,167, dated August 2, 1904.

Application filed March 16, 1904. Serial No. 198,400. (No specimens.)

*To all whom it may concern:*

Be it known that I, WILLIAM S. BUCKLIN, a citizen of the United States, residing at Phalanx, county of Monmouth, State of New Jersey, have invented a new and useful Article of Manufacture and Process of Making the Same, of which the following is a specification.

The present invention relates to a new article of manufacture and process of making the same; and the object of the invention is the production of a substance which by the nature of its properties is especially adapted for certain purposes hereinafter described and for which heretofore no satisfactory material has to my knowledge been found. The new composition is a derivative of lac, but is materially different from commercial lac and other natural resinous gums or substances, being chiefly characterized by its refractoriness to heat of comparatively high temperatures, the absence of volatile or flavoring principles, and the capacity of being readily applied in the manner of a paint or varnish to form a tenacious coating having the above qualities.

The purpose for which this substance is most specially serviceable is the lining of metal or other receptacles for holding or preserving foods for avoiding the contamination arising from the contact of more or less chemically-active food-juices with the material of the receptacle. It should be pointed out in the art of canning food that the food is first sealed in the can by soldering on the cover-caps and is subsequently "processed" or cooked at a temperature ranging from 212° to 240° Fahrenheit and sometimes as high as 250° Fahrenheit, the heat of the soldering-iron being of course more severe though of shorter duration. The new composition of matter in the form of a lining on the interior of a can does not deteriorate when subjected to the severest of these heats or impart a detectable flavor to the most delicate or acidulous food and under the conditions of ordinary wear and tear is found to provide adequate covering for the material of the can and protection for any kind of food.

I have discovered that the commercial forms of lac can by a simple treatment be converted into a substance substantially unaffected by either the heat of treatment or the acids or alkalies of the materials employed in canning foods and which substance is by its adhesiveness and flexibility well adapted to be used in the form of a thin coating for cans or other receptacles.

The method of making the new article of manufacture consists in subjecting the lac of commerce to heat in an inert or chemically non-active medium until the components, iningredients, or derivatives which are volatile, soluble, or decomposable under the temperatures and conditions met with in processing foodstuffs are eliminated, or at least all such components, ingredients, or derivatives as would tend to impair the flavor or appearance of the foodstuffs are eliminated.

My process can be carried on with perhaps best advantage by heating the lac in water maintained at a high temperature and pressure, a temperature of at least 320° or 325° Fahrenheit maintained for twenty-eight or thirty hours being preferred as giving the best results, though I have obtained practically the same product by treating lac in water of less temperature for a longer period, and I have ascertained that a substantially similar product is secured by heating the lac in an inert atmosphere, such as illuminating-gas, for five or six hours and at a temperature of about 325° Fahrenheit, my experiments showing that heat applied in any inert medium when in excess of the melting-point of the lac will in time produce my new lac derivative, the time of treatment naturally increasing as the heat is lowered.

Apparatus such as shown in the accompanying drawings may be conveniently employed for carrying out the process.

Figure 2:
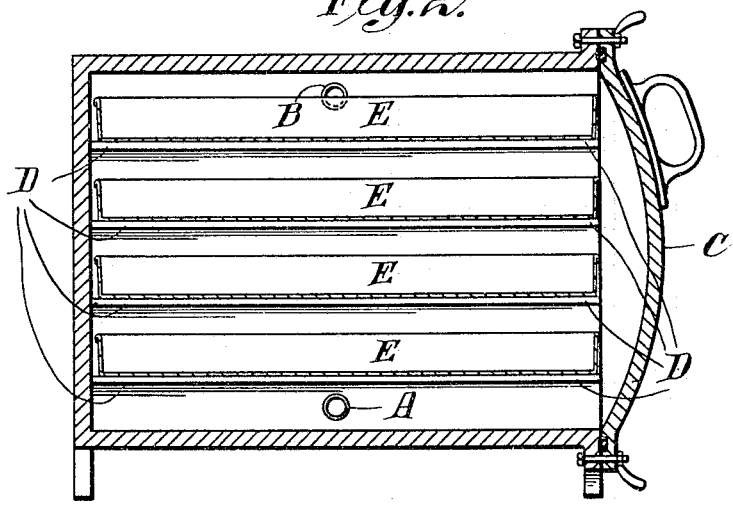

In the drawings, Figure 1 is a transverse, and Fig. 2 a longitudinal, section view of a retort, which may be of any suitable conformation, having an inlet A and outlet or exhaust B, and a removable cover C, adapted to be bolted against and close the open end of the retort, a suitable gasket being disposed between the two parts. The retort preferably opens horizontally and is provided with pairs of projecting horizontal ledges D for supporting the trays or pans E, which may be inserted in obvious manner when the cover is removed. The substance to be treated is placed in the pans in lumps or in powdered form, being preferably covered with water when inserted. When the cover is bolted in place, steam is allowed to enter the retort at A and exhausts as steam or water of condensation at B. In this manner the material under treatment will be submerged in hot water, the temperature of which will of course depend upon the pressure of the steam. With the pressure at about eighty pounds the temperature will be between 300° and 325° Fahrenheit, and the water exhausted from time to time or continuously through B at the beginning of the process will be found to be bitter and strongly of the flavor of the material. When ordinary commercial shellac is used, from twenty-eight to thirty hours will elapse before this taste disappears, which will indicate that the process is finished. With bleached lac or the so-called "bone-dried" lac the time required will be considerably less, and with all kinds of lac the waste water is slightly acid in character, which, however, diminishes with the progress of the process. When the pans are removed from the retort, they are found to contain a mass of opaque brownish substance, which is rather rubbery when hot, but on cooling becomes harder and sometimes, in large pieces, slightly brittle. After being dried it is ready for preparation with a suitable volatile vehicle, and in this form it can be easily applied to the interior of metal cans or to other surfaces, a convenient method being by spraying, which can be done automatically and with great rapidity. Upon drying and without further treatment the can will be ready for use.

The product substance will be found to differ from the original by the absence of substantial flavoring principles at any temperature up to near its point of decomposition and in the fact that it has practically no melting-point and can resist temperatures frequently as high 590° or 600° Fahrenheit without charring or decomposing. It also differs in its action under chemical tests, being insoluble in many of the usual and most effective solvents for resins and being only partially soluble and with considerable difficulty in absolute alcohol.

The non-flavoring quality of the product is fully evidenced not only by the fact that it is practically tasteless when chewed indefinitely, but also by the fact that the most delicate foods and the most acidulous juices of fruits, &c., when sealed and cooked in the coated cans and preserved for long periods are not detectably affected by it.

When the freshly-prepared product is boiled for a long time in pure water, a delicate trace of the characteristic lac odor may sometimes be detected; but this is so exceedingly faint that its presence is an entirely negligible factor. Under the influence of heat it becomes slightly softer without, however, becoming capable of being drawn out into threads until the point of decomposition is reached, above which it burns with a smoky flame, suggesting lac in odor.

The solution which I apply to the cans is prepared by macerating or reducing the material to a fine state of comminution and thoroughly mixing it with alcohol of ordinary commercial strength, absolute alcohol not being essential for the production of satisfactory results. Minute undissolved particles will remain suspended in the solution; but their presence is not objectionable, being, in fact, preferred to using the true solution without them, as they give body and a distinctive appearance to the coating.

It is manifest that additional material which is substantially inert and non-flavoring may be mixed into this solution, if desired, as may also coloring-matter, and, furthermore, that the principle of my invention may be utilized by treating the lac after it has been coated on the can instead of making it in quantities and applying it to the can, as above described.

In another application filed by me March 16, 1904, Serial No. 198,399, I have described and claimed the receptacle lined with a coating partly or wholly consisting of the material above described.

Having described my invention, what I claim, and desire to protect by United States Letters Patent, is—

1. A process of producing an inert material suitable for use as a coating, which consists in heating lac in an inert medium at a temperature in excess of its melting-point to eliminate volatile and food soluble constituents.

2. A process of producing an inert material suitable for use as a coating, which consists in heating commercial lac in an inert medium at a temperature in excess of 212° Fahrenheit to eliminate volatile and soluble constituents which impart flavor to foods, and raise the melting-point of the residue.

3. A process of producing an inert lac derivative, which consists in subjecting commercial lac to the action of water at a temperature in excess of 212° Fahrenheit to eliminate volatile and soluble derivatives and raise the melting-point of the residue.

4. A process of producing an inert lac derivative, which consists in heating commercial lac in an inert protective medium at a temperature of about 325° Fahrenheit to eliminate constituents or derivatives flavoring to food-juices, and raise the melting-point of the residue.

5. As a new article of manufacture, a lac derivative characterized by refractoriness to heat of 240° Fahrenheit and freedom from constituents volatile or soluble at that temperature which impart flavor to food-juices.

6. As a new article of manufacture, a lac derivative devoid of the principles of lac which impart flavor to food-juices at temperatures below 250° Fahrenheit.

7. As a new article of manufacture, a lac derivative capable of forming an elastic and tenacious coating, characterized by absence of principles flavoring to food-juices and by being unaffected by the same or the heat incident to canning them.

In testimony whereof I have signed my name to this specification in the presence of two subscribing witnesses.

WILLIAM S. BUCKLIN.

Witnesses:
    EDWIN B. ROOT,
    H. G. KIMBALL.